Figure 1:
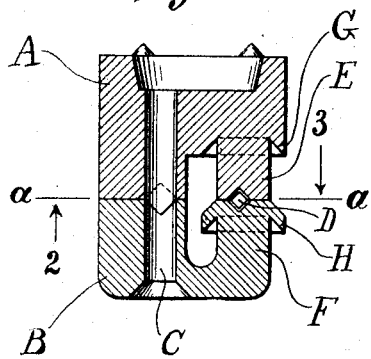

H. R. KELLS.
INSULATOR.
APPLICATION FILED DEC. 3, 1915.

1,194,747.

Patented Aug. 15, 1916.
3 SHEETS—SHEET 1.

Witnesses:
M. E. Levy
Chas. W. LaRue

Inventor:
Herbert R. Kells
by Chas. Lyon Russell
his Attorney.

H. R. KELLS.
INSULATOR.
APPLICATION FILED DEC. 3, 1915.
1,194,747.
Patented Aug. 15, 1916.
3 SHEETS—SHEET 3.
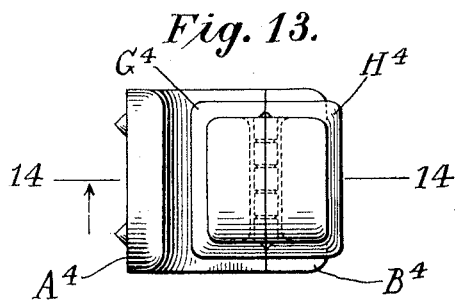
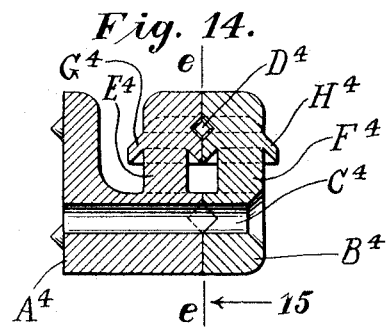
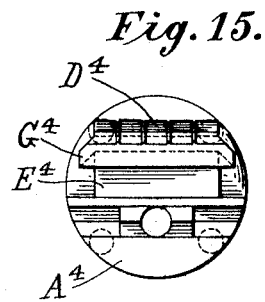
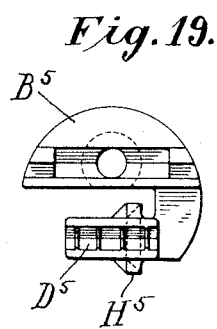
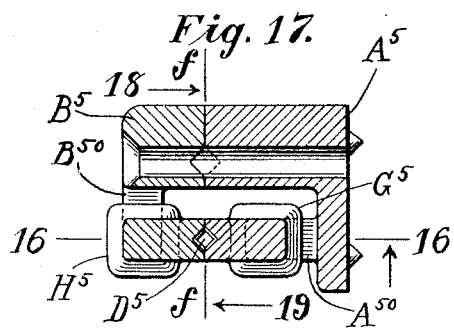
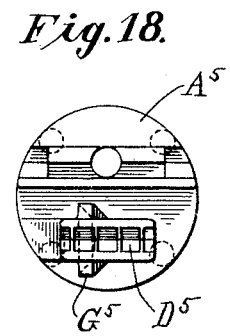
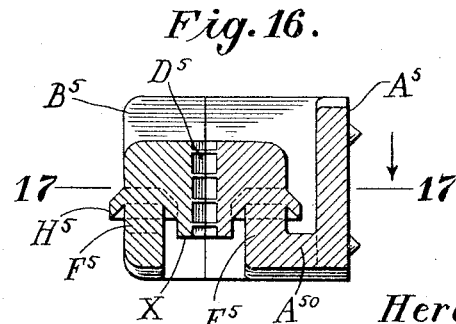
Witnesses:
M. E. Levy
Chas. W. La Rue
Inventor:
Herbert R. Kells
by Chas. Lynn Kumer
his Attorney.

UNITED STATES PATENT OFFICE.

HERBERT R. KELLS, OF NEW YORK, N. Y.

INSULATOR.

1,194,747.  Specification of Letters Patent.  Patented Aug. 15, 1916.

Application filed December 3, 1915. Serial No. 64,802.

*To all whom it may concern:*

Be it known that I, HERBERT R. KELLS, a citizen of the United States, and a resident of New York, borough of Brooklyn, in the county of Kings and State of New York, have invented certain new and useful Improvements in Insulators, of which the following is a specification.

This invention relates to insulators and more particularly such as are employed indoors for clamping and supporting various electric wires, the subject of the invention being to provide means not only for insulating the wire from its support but also for insulating the securing member of the insulator from the wire and from water traveling along the same.

In the drawings accompanying this specification several practicable constructional embodiments of the invention are illustrated, in which drawings,—

Figure 4:
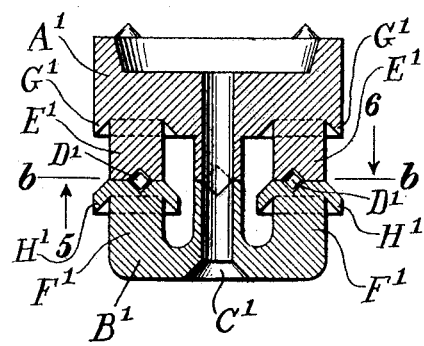
Figure 2:
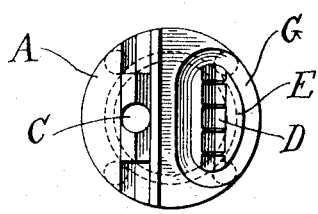
Figure 5:
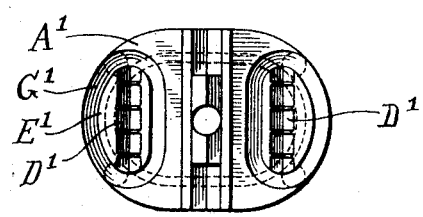
Figure 3:
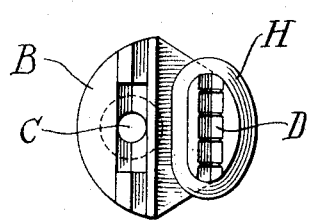
Figure 6:
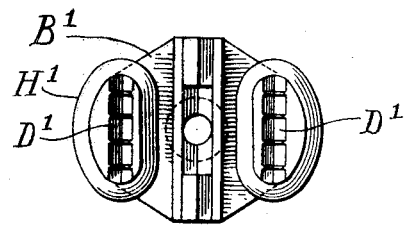
Figure 7:
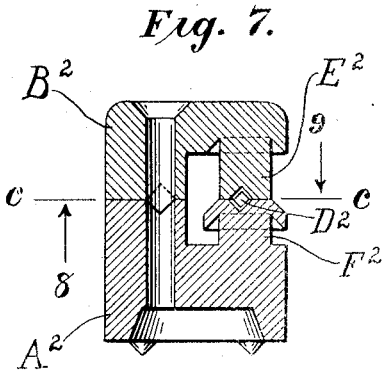
Figure 10:
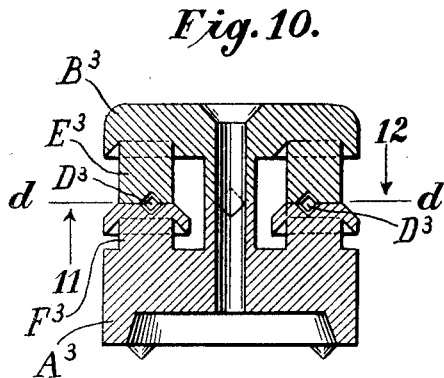
Figure 8:
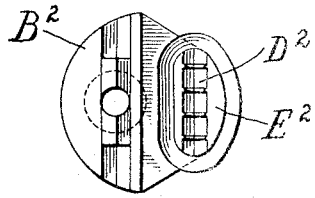
Figure 11:
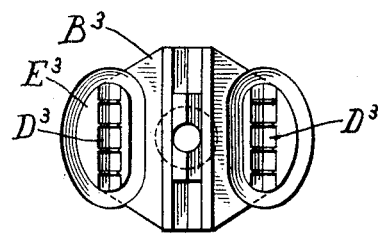
Figure 9:
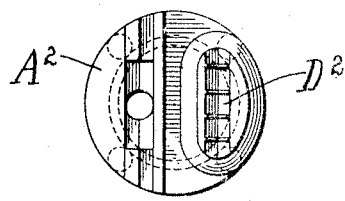
Figure 12:
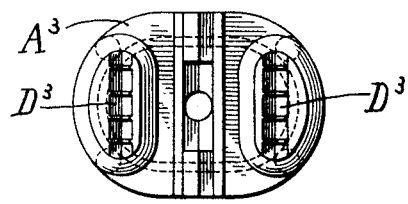

Figure 1 shows a vertical section of an insulator designed for suspending a wire from the lower side of a horizontal body. Figs. 2 and 3 are plans taken at the plane of meeting between the two members of the insulator, such plane being indicated at the line $a$—$a$ in Fig. 1, Fig. 2 being a plan looking upwardly and Fig. 3 being a plan looking downwardly. Figs. 4, 5 and 6 are views similar to Figs. 1, 2 and 3 of an insulator for two horizontal wires, the plane of meeting being indicated by line $b$—$b$ of Fig. 4. Fig. 7 is a vertical section of an insulator for supporting a wire above a horizontal surface. Figs. 8 and 9 are plans taken at the meeting plane indicated by the line $c$—$c$ of Fig. 7, looking up and down respectively. Figs. 10, 11 and 12 are similar views of an insulator for supporting two horizontal wires above a horizontal surface, the meeting plane being indicated by line $d$—$d$ of Fig. 10. Fig. 13 is a plan of an insulator for supporting a horizontal wire laterally of a vertical surface. Fig. 14 is a vertical section of the insulator shown in Fig. 13 taken about the plane of the line 14—14. Fig. 15 shows the end elevation of the base portion of the insulator shown in Figs. 13 and 14, it being taken at the meeting plane between the two parts represented by the line $e$—$e$. Fig. 16 represents a vertical section of an insulator for supporting a vertical wire laterally of a vertical surface, taken at about the plane of the line 16—16 of Fig. 17. Fig. 17 shows a horizontal section of the insulator shown in Fig. 16 taken at about the plane of the line 17—17 looking downwardly. Fig. 18 shows the end elevation of the base portion of the insulator shown in Figs. 16 and 17 and taken at the meeting plane represented by the line $f$—$f$ of Fig. 17 looking in the direction of arrow 18; and Fig. 19 is the elevation of the cap end of the insulator also taken on the plane indicated by the said line $f$—$f$ and looking in the direction of arrow 19.

Considerable difficulty has been experienced in insulating wires particularly those installed in places where the atmosphere is moist or charged with vapor. Not only is the wire seat exposed to conditions wherein a film or layer of water will extend from the wire seat to the surface upon which the insulator is carried, but also water traveling along the wire continues its course from insulator to insulator with very disastrous electrical results.

In my improved construction I provided an insulator wherein there are essentially two members, one adapted to engage the supporting surface and the other adapted to clamp the wire against the former and be secured in position preferably by a screw passing through the two members. The members are respectively formed with mating halves of a wire seat, each half seat being preferably formed by a projection from the member carrying it and a water shedding device or petticoat being provided at the upper portion of the projection or post.

Although I have illustrated various constructional forms of the invention it will be found that certain basic characteristics prevail throughout the various forms and that these forms are set forth as illustrative examples of the invention.

Having particular reference to Fig. 1 it will be seen that one of the pair of members constitutes a base A designed to be supported upon the underside of some structure preferably a horizontal face as, for instance, that of a ceiling or ceiling-beam. The other member B will for convenience, be termed the cap member. These two parts are provided with suitable faces for assuring proper relative positioning and with a hole or seat C for receiving a suitable screw for holding the parts in clamped position and securing the entire insulator to its supporting structure. The members A and B are shown respectively formed with the mating halves of a wire seat D. The member A carries a depending projection or post E, at the lower portion of which is formed the upper half of the wire seat and the member B carries an upstanding projection or post F, upon the upper face of which is formed the half of the wire seat D with which the lower or cap member B is provided. Means for conveying the water away from each of these projections or posts are provided at their upper portions. A deflecting device G is provided at the upper portion of the post E and a deflecting device H is provided at the upper portion of the post F. These water conveying portions are frequently termed petticoats, and such term will for convenience hereinafter be employed. The petticoat G serves to convey water coming from the body portion of the insulator or from the surface upon which it is mounted away from the post and the wire seat. The petticoat H serves to convey water traveling along or coming from the wire away from the post F. By this means a double insulation is afforded. Water is prevented from flowing directly down the side of the insulator to the wire in a steady stream and water is also prevented from flowing from the wire across the insulator and engaging the body portion of the same, or from coming in contact with the screw or other fastening used for clamping the parts together and to their supporting base.

The wire seat D is shown of angular cross-section and provided with ribs or ridges for preventing the wire slipping and also to more effectually prevent water traveling along the wires and past the wire seat.

In Figs. 4, 5 and 6 a construction similar to that shown in Figs. 1, 2 and 3 is illustrated. In this case however, there is provided a pair of wire seats D' D' for supporting a pair of parallel horizontal wires below the horizontal surface of some supporting structure. In this instance the wire seats are located upon the respective sides of the screw seat C' and are at equal distances therefrom. It is to be noted in this construction as in the various other constructions illustrated that the wire seat below the wire is carried by an upstanding structure, namely, the post F'.

In the constructional form shown in Figs. 7, 8 and 9 the base member $A^2$ of the pair of members is shown adapted for resting upon the upper horizontal surface of a supporting member and for supporting a horizontal wire, the cap member $B^2$ in this instance carrying the dependent post $E^2$ and the base member carrying the upstanding post $F^2$. The same general principles however prevail, among which is that of having a water deflector or petticoat at the upper portion of each of the posts.

Figs. 10, 11 and 12 illustrate a double form of that shown in Figs. 7, 8 and 9, namely, an insulator for supporting a pair of parallel horizontal wires above a horizontal surface. The same reference characters are used in this figure as in the Fig. 7 construction with the additional exponent 3 employed, for instance the wire seats are designated by the reference character $D^3$.

In the construction shown in Fig. 10 as in the construction shown in Fig. 4 not only is the wire seat insulated from the various portions of the insulator and its support and these insulated from the wire, but each wire is insulated from the other for effectually preventing cross-circuiting which is quite a problem, particularly if water is falling or accumulates upon the wires in any large quantity, or if water accumulates and runs along the surface from which the wires are suspended or supported.

The form of construction shown in Figs. 13, 14 and 15 is for supporting a horizontal wire laterally of a vertical surface. The base member $A^4$ is provided with a suitable face for engaging a vertical surface, and is, as before, provided with suitable means for coöperative engagement with the cap member $B^4$ whereby the two are properly relatively positioned and through which properly positioned members passes a suitable securing screw, the hole $C^4$ being provided for this purpose. The securing of the cap and base portion together as in the other instances clamps the wire in the wire seat, the halves of which are respectively formed on the members of the pair. In this instance both posts $E^4$ $F^4$ are shown upstanding from their respective carrying members and each post is provided with a water deflector or petticoat designated by the reference characters $G^4$ $H^4$ respectively. These however, between the two posts merge together into a single deflector. The relative and mutual insulation from the wire to the supporting base and from the supporting base to the wire is effected in substantially the same manner in this form of the construction as in the other embodiments herein illustrated.

The constructional form of the invention represented in Figs. 16 to 19 inclusive is for supporting a vertical wire laterally of a vertical surface. In this illustration the wire seat $D^5$ is located laterally of the main portion of the two members, the body part $A^5$ and the cap part $B^5$, that is laterally in a horizontal direction. The body $A^5$ is shown provided with an arm $A^{50}$ at the end of which is formed the upstanding post $E^5$ and the cap member $B^5$ is provided with an arm $B^{50}$ at the end of which is formed the upstanding post $F^5$. These posts are respectively provided at their upper parts with the water deflectors or petticoats $G^5$ and $H^5$. For the purpose of giving considerable body to the surface forming the wire seat below the upper part of the posts the petticoats merge into an enlargement X so located however that water will be deflected from the wire.

The forms shown in Figs. 13 and 16 are quite useful in combination where wires are strung horizontally along a wall and they either have to go up or down. In this case the horizontal portion of the wire is carried by the Fig. 13 form and the vertical portion carried by the Fig. 16 form. The wire at the bend, if this is of suitable radius, does not need any particular support. In fact, the two insulators can be placed so near together that the wire may be bent sharply from one to the other and pass in a straight line from seat to seat.

It will be further noted that in each illustrated embodiment of my improvements the wire seat portions are isolated from those portions of the members adapted for engaging the supporting surface, thereby providing insulating air spaces therebetween. This particular feature of construction supplies an additional security against short circuiting.

Various changes may be made within the scope of the claims without departing from the spirit of the invention.

What I claim is:—

1. An insulator comprising a support engaging member and a cap member, each of said members including a main portion and an extending post, said posts being respectively formed with the mating halves of a wire seat, said wire seat being isolated from the main portions of said members by an air space, and each post being provided at its upper part with a petticoat.

2. An insulator comprising a pair of members respectively formed with the mating halves of a wire seat, and a petticoat between each such half seat and the main portion of the member on which the same is formed.

Signed at New York, in the county of New York and State of New York, this 30th day of November, 1915, before two subscribing witnesses.

HERBERT R. KELLS.

Witnesses:
CHAS. W. LA RUE,
MORRIS REAMER.

Copies of this patent may be obtained for five cents each, by addressing the "Commissioner of Patents, Washington, D. C."